United States Patent [19]
Seifert et al.

[11] Patent Number: 4,825,718
[45] Date of Patent: May 2, 1989

[54] TORSIONAL VIBRATION DAMPER

[75] Inventors: Heinz Seifert, Laudenbach; Hans-Gerd Eckel, Hirschberg, both of Fed. Rep. of Germany

[73] Assignee: Firma Carl Freudenberg, Weinheim/Bergstr, Fed. Rep. of Germany

[21] Appl. No.: 148,998

[22] Filed: Jan. 27, 1988

[30] Foreign Application Priority Data

May 16, 1987 [DE] Fed. Rep. of Germany ....... 3716441

[51] Int. Cl.$^4$ ............................................. F16F 15/10
[52] U.S. Cl. ...................................... 74/574; 74/572; 464/180; 464/182; 464/89
[58] Field of Search ................ 464/180, 182, 89; 74/574, 573 F, 572

[56] References Cited

U.S. PATENT DOCUMENTS

| | | | |
|---|---|---|---|
| 3,495,475 | 2/1970 | Rumsey | 74/574 |
| 3,552,230 | 1/1971 | McLean | 74/574 |
| 3,678,782 | 7/1972 | Aoki | 74/574 |
| 4,341,130 | 7/1982 | Shepherd et al. | 464/180 |
| 4,385,897 | 5/1983 | Mallet | 464/182 X |
| 4,496,332 | 1/1985 | Keller et al. | 464/89 |
| 4,516,955 | 5/1985 | Worner et al. | 464/180 X |
| 4,571,215 | 2/1986 | Hansen | 464/180 |
| 4,734,079 | 3/1988 | Viets | 74/574 |
| 4,736,510 | 4/1988 | Jorg et al. | 74/574 X |
| 4,764,152 | 8/1988 | Jorg et al. | 464/89 |
| 4,772,245 | 9/1988 | Readman et al. | 464/89 |

FOREIGN PATENT DOCUMENTS

| | | | |
|---|---|---|---|
| 0250913 | 1/1988 | European Pat. Off. | 74/574 |
| 3423222 | 12/1984 | Fed. Rep. of Germany | 74/574 |
| 3340258 | 5/1985 | Fed. Rep. of Germany | 74/574 |
| 3340259 | 5/1985 | Fed. Rep. of Germany | 74/574 |
| 3535803 | 9/1986 | Fed. Rep. of Germany | 74/574 |
| 3535286 | 4/1987 | Fed. Rep. of Germany | 74/574 |
| 3716441 | 4/1988 | Fed. Rep. of Germany | 74/574 |
| 1402706 | 8/1975 | United Kingdom | 464/89 |

Primary Examiner—Gary L. Smith
Assistant Examiner—Vinh Luong
Attorney, Agent, or Firm—Felfe & Lynch

[57] ABSTRACT

A torsional vibration damper, comprising a hub ring and a rotating ring, which encircle one another in a radial space and are positioned in one another by a guide so that they can rotate relative to one another. The collars of the hub ring and rotating ring, between which there is a clearance in the axial direction and which are connected by an essentially tubular resilient body of rubber extending in the axial direction, lock into the gap formed by the space. The resilient body has a radial clearance on the one hand from the hub ring and, on the other, from the rotating ring. The gaps formed by the clearance in the radial and axial directions, are closed off towards the outside and filled with a flowable, incompressible medium.

13 Claims, 9 Drawing Sheets

TORSIONAL VIBRATION DAMPER

The invention relates to a torsional vibration damper.

Such a torsional vibration damper is known from U.S. Pat. No. 4,496,332. The resilient body of soft, elastic rubber, which envelop the rotational axis in tubular fashion here serves especially for decoupling, that is, for the vibrational isolation of the fan wheel of a ceiling fan from the motor-induced vibrations. In this case, however, the rotational speed of the fan wheel is extremely low. Consequently, there are no substantial centrifugal forces in the area of the resilient body. There can, therefore, also not be any substantial impairment of the relative mobility of the resilient body with respect to the metallic sleeve of the fan wheel, which surrounds it on the outside. The use of appropriately constructed and disposed resilient bodies to dampen the rotational vibrations of rapidly rotating objects has not previously been known.

It is an object of the invention to provide a torsional vibration damper, which is distinguished by good effectiveness in relation to torsional vibrations of a frequency lower than 100 Hz and preferably lower than 50 Hz. Moreover, the torsional vibration damper of the invention also has an improved out-of-balance behavior up to rotational speeds of 12,000 rpm, even when the axis of rotation is positioned horizontally.

For the torsional vibration damper of the invention, the resilient body is disposed at a radial distance from, on the one hand, the hub ring and, on the other, the rotating ring. At least the gap between the rotating ring and the resilient body, formed by the distance therebetween and lying radially on the outside of the resilient body, is closed off in the radial and axial directions towards the outside and filled with a flowable, incompressible medium. As a result, the resilient body is unable to touch either the outside or the inside of the surfaces opposite to it on the one hand of the rotating ring and, on the other, of the hub ring. It is, therefore, not exposed to any frictional influences even when there are relative rotations between the two rings. Its relative mobility in relation to the two adjacent machine parts is fully maintained even in this case. It experiences no change whatsoever, even when the highest rotational speeds are introduced into the torsional vibration damper, because the centrifugal forces, which arise in this case in the resilient body, are transferred by the flowable and incompressible medium surrounding it on the outside to the inflexible rotating ring and are thus neutralized. Deformations due to centrifugal forces can therefore no longer appear in the resilient body of the torsional vibration damper of the invention.

Rather, the only operation induced deformations, to which the resilient body is exposed, arise exclusively out of the torsional vibrations, which must be absorbed due to the operation. For these, the resilient body can be designed in an optimum manner, so that an excellent damping effect can be achieved.

In the simplest construction, only the annular gap, which surrounds the resilient body on the outside, is filled with a flowable, incompressible medium. The construction has the secondary advantage that the operationally induced warming up and the corresponding increase in volume of the resilient body and/or of the incompressible medium contained in the gap no longer must lead to the build-up of an externally appearing pressure. Rather, they can be compensated for in the usual application cases by deliberately putting up with a corresponding, radial, inwardly directed relative displacement of the resilient body preferably comprising a rubber-elastic material. If this is undesirable, the possibility exists of providing the jacket forming the resilient body in at least one place of its periphery with a radial opening, through which the incompressible medium can escape towards the inside to the required extent. In such a case, it would be advisable to have the same density as the material forming the resilient body. In this case, should the torsional vibration damper be put out of action, for example, in the case of a shaft stoppage, a relative displacement of the liquid volume contained therein into the zones then at the bottom can result, depending on the position of an appropriate opening.

However, on once again introducing a rotational movement, the relevant amounts are distributed once again very rapidly in an axially symmetrical manner as a result of the centrifugal forces then acting on them into the outwardly pointing free spaces. Here, they once again bring about the above described radial support of the resilient body on the rotating ring, which is inflexible in the radial direction towards the outside.

The damping effect, achieved from a qualitative point of view, can be magnified by filling not only the gap between the resilient body and the rotating ring, but also the gap between the resilient body and the hub ring with a flowable, incompressible medium. With respect to its composition, this medium may be identical with that contained in the radial, external gap. The volume increase resulting from the normal operation-induced warming up, moreover, requires special attention in this case. It can, for example, also be compensated for owing to the fact that the gaps containing the liquid are flexibly bounded in the axial and/or the radial direction at least at one place on the periphery, for example, by a resilient body.

As flowable medium, oil may be used in the torsional vibration damper of the invention. This oil may have an extremely low viscosity. In conjunction with a low-damping material of construction for the resilient body, this permits extreme quenching effects to be achieved. Appropriate constructions of the torsional vibration damper of the invention are suitable especially for applications, in which a narrowly limited frequency range of critical extraneous vibrations make an appearance.

For appropriate application cases, the centrifugal mass of the rotating ring is matched to the springiness of the resilient body in such a way, that the resulting resonance frequency is essentially identical with the frequency of the undesired oscillation.

In contrast to this, it has proven to be advantageous for the usual applications to use an oil of higher viscosity, for example, a silicone oil. In this case, there is a significantly broader band damping action.

Fats may also be used as the flowable medium. Aside from a simplification of the sealing problems, there is a particularly good permanent lubrication in the case of the guiding mechanisms, which are required for positioning the rotating ring on the hub ring. It is, therefore, possible to produce embodiments, which do not require any subsequent lubrication during the whole period of their use.

In regard to a further magnification of the qualitatively achieved damping effect, it has proven to be advantageous to provide the resilient body at least on the outside with at least one radial projection, which extends essentially axially, and to expand the gap in the area of the projection into a pocket, which locks into the outer ring and which encloses the projection in the untwisted state of the rotating ring in a clearance. In the event of a relative twisting of the rotating ring, a greatly magnified damping effect results in this case, as well as an end stop, through which the maximum deflection of the flywheel is limited to a fixed value.

Damage can be excluded in this manner even in cases of extreme overloading.

In the circumferential direction, the pocket may have an essentially, constant, radial depth. In this case, aside from limiting the maximum deflection of the rotating ring to a fixed value, it brings about a linear increase in the damping effect after there has been relative twisting. As opposed to this, in designs, in which the pocket is bounded on the outside by an area, which has essentially a profile with a circular boundary with a radius (R 1), which is smaller than the radius (R 2) of the circular area forming the boundary of the gap outside of the pocket, there arises, aside from a limitation of the relative twistability of the rotating ring to a fixed value, a progressive increase in the damping action after the onset of the relative twisting. For this, there are also numerous meaningful application possibilities.

In cases in which the gap, which forms the boundary of the resilient body on the outside, as well as the gap, which forms the boundary of the resilient body on the inside is filled with an identical, incompressible liquid, the possibility exists of assigning recesses, which are contracted to a restrictor opening and which penetrate the resilient body in the radial direction and are offset in the circumferential direction, to the projections of the type given above. If there is relative twisting of the rotating ring, they bring about a further increase in the overall damping effect achieved. The matching of the diameters and the design of the restrictor openings is determined largely by the springiness of the resilient body, the viscosity, the magnitude and construction of the projections, which lock into the pockets, as well as by the aimed-for damping effect.

Moreover, each gap of the torsional vibration damper of the invention, in which, depending on the operation, either liquid is present or into which liquid can penetrate in some operating state, needs to be sealed all around. This condition can be fulfilled on the outside and the inside by using a rotating ring and a hub ring, which are impermeable in the areas bounding the gap. As opposed to this, seals are required on both sides in the axial direction. These seals affect the mobility of the rotating ring relative to the hub ring as little as possible. In this respect, it has proven to be particularly advantageous if the gap is closed off on both sides in the axial direction by rigid, liquid-tight sealing washers, which are connected with the rotating ring, and if the sealing washers can be twisted relatively to the hub ring and overlap the profile of the gaps in the radial direction at least to the plane of the innermost periphery. With such a construction, the sealing washers shall preferably be brought close to the hub ring. A labyrinth seal may be provided in the area between the two. Such an arrangement favors the achievement of a sufficient sealing result in relation to the endeavor of the liquid contained to leave the torsional vibration damper at the lowest place in the cavity in the event of a stoppage. Such an endeavor becomes less evident as the viscosity increases and as the width of the gap decreases.

An appropriate construction of the seal is therefore recommended especially in those cases, in which the liquid contained has a higher viscosity and can be prevented from leaving the gaps by a comparatively narrow gap.

As against this, a higher quality seal, for example, a lip seal, is required in those cases, in which the gaps contain a liquid of very low viscosity. This lip seal is advisably positioned statically on the hub ring, the sealing ring touching the rotating ring under the influence of the centrifugal force. Different constructions are also possible, especially constructions in which the lip seal is supported statically in the rotating ring and has a sealing lip, which can be raised from the hub ring under the influence of the centrifugal forces. This construction is recommended especially in conjunction with sealing washers of the type described above. During the normal rotational motion of the torsional vibration damper, there are no sealing problems anyhow. The sealing lips, lifted off the countersurface under such operating conditions, are then also not exposed to wear. The service life of the torsional vibration dampers is thus distinctly lengthened.

In accordance with the invention, a torsional vibration damper comprises a hub ring and a rotating ring which encircles the hub ring in a radial space. The hub ring is positioned in the rotating ring. The damper includes a guide on the hub ring so that the rings can rotate relative to one another. The hub ring and the rotating ring have collars between which there is a clearance in the axial direction and which are connected by an essentially tubular resilient body extending in the axial direction. The collars are individually attached to the rings in the space. The resilient body has a radial clearance from the hub ring and from the rotating ring and the clearance between the rotating ring and the resilient body forms at least a gap in the radial and axial directions which is closed off towards the outside. The damper also includes a flowable, incompressible medium filling at least the gap.

For a better understanding of the invention, together with other and further objects thereof, reference is made to the following description, taken in connection with the accompanying drawings, and its scope will be pointed out in the appended claims.

Referring now to the drawings.

Figure 1:
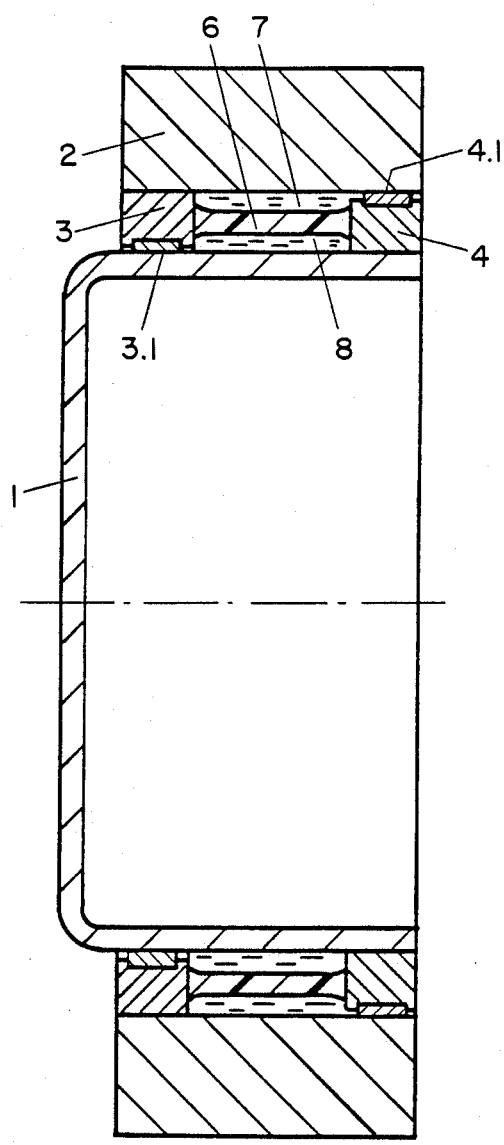
FIG. 1 shows a torsional vibration damper in accordance with the invention in longitudinal section, in which gaps adjoining the resilient body on the inside and the outside are filled with liquid.
Figure 2:
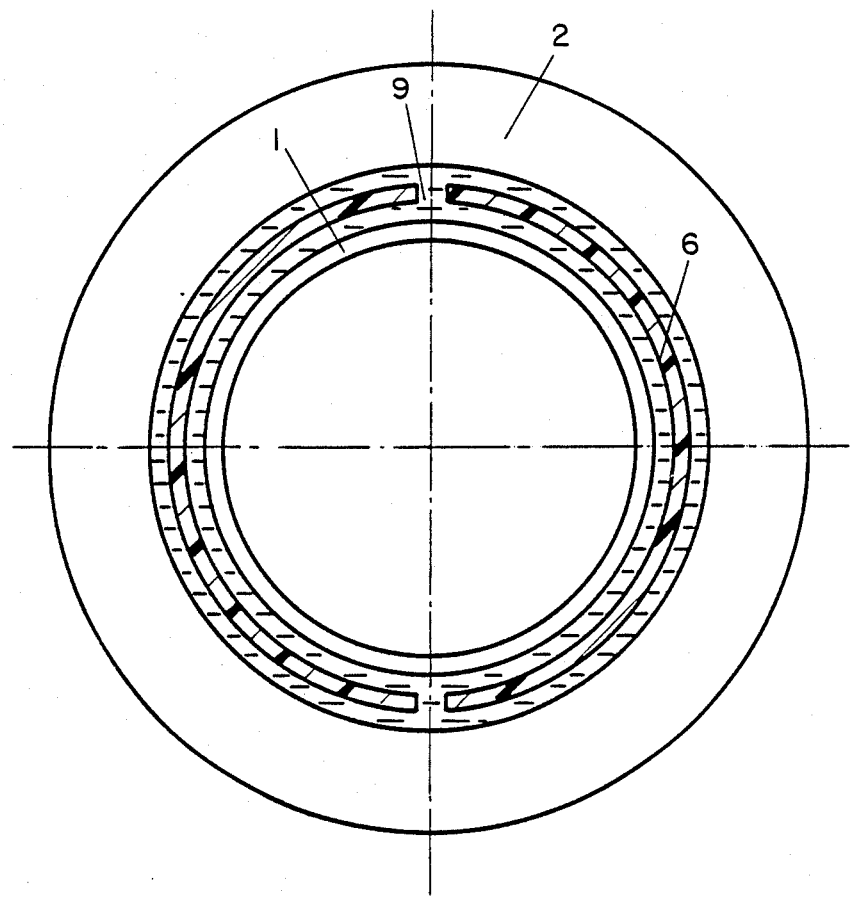
FIG. 2 shows a construction similar to that of FIG. 1 in a cross section, in which the resilient body is pierced at two places on its periphery by a radial division of the jacket forming it.
Figure 3:
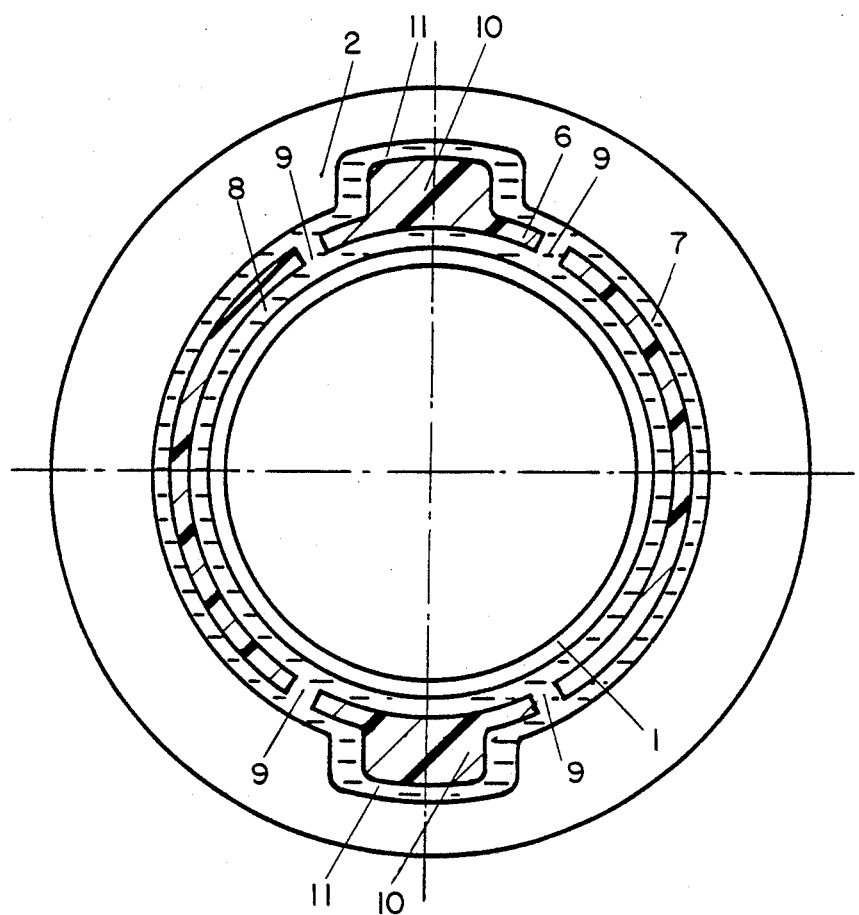
Figure 4:
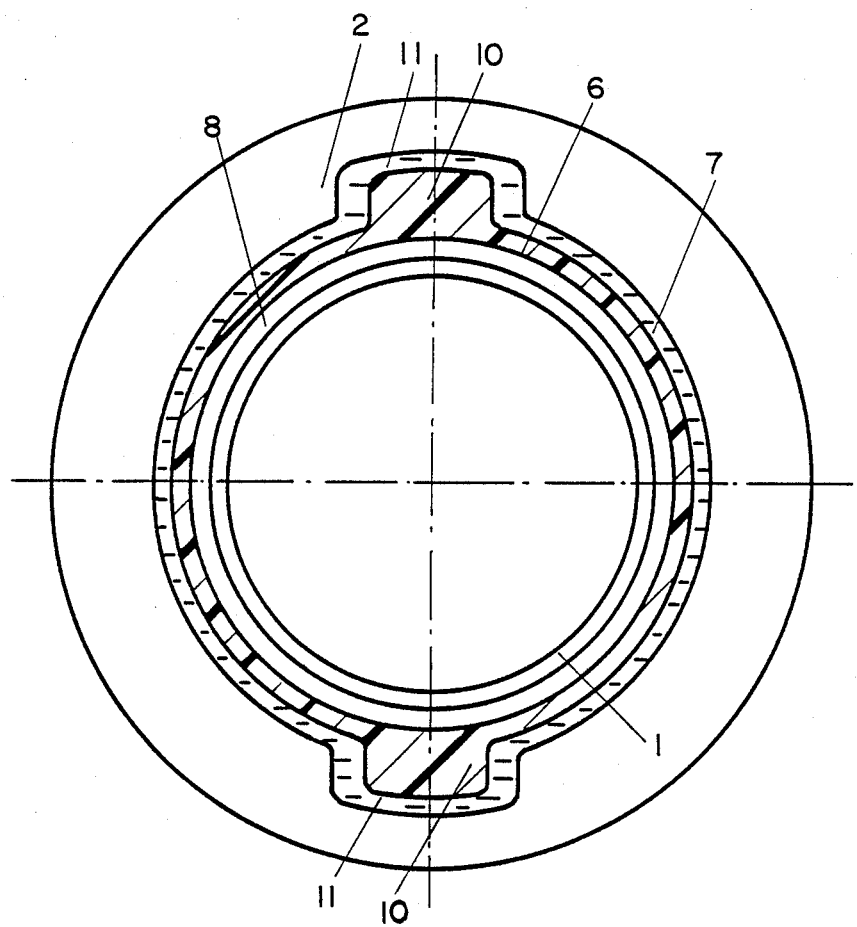
Figure 5:
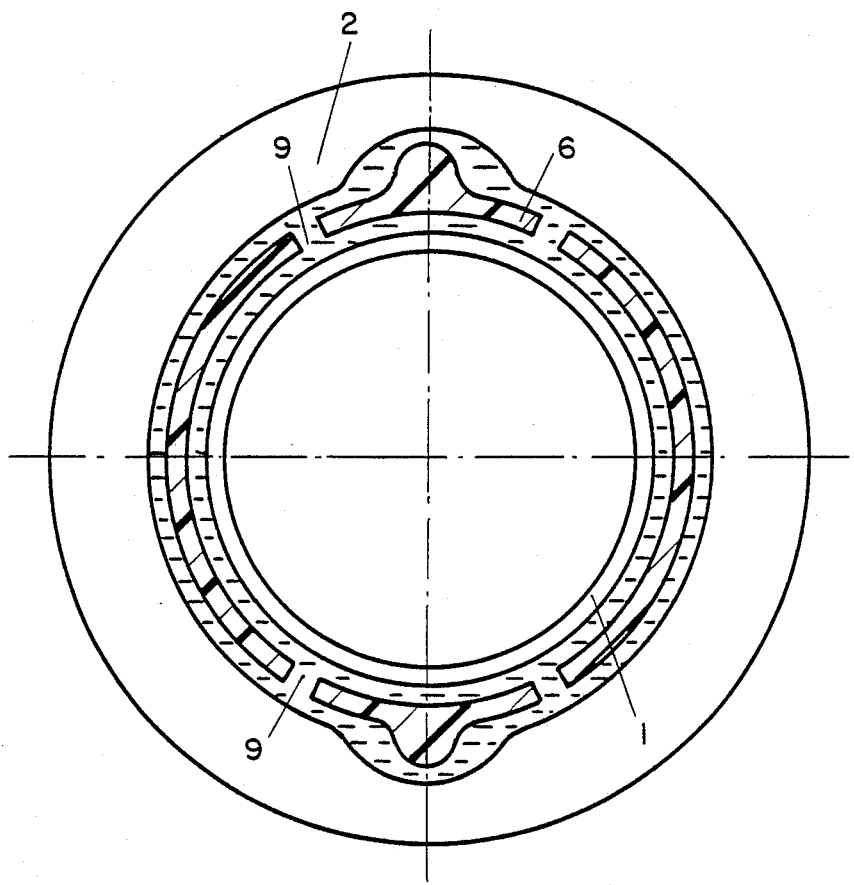
Figure 6:
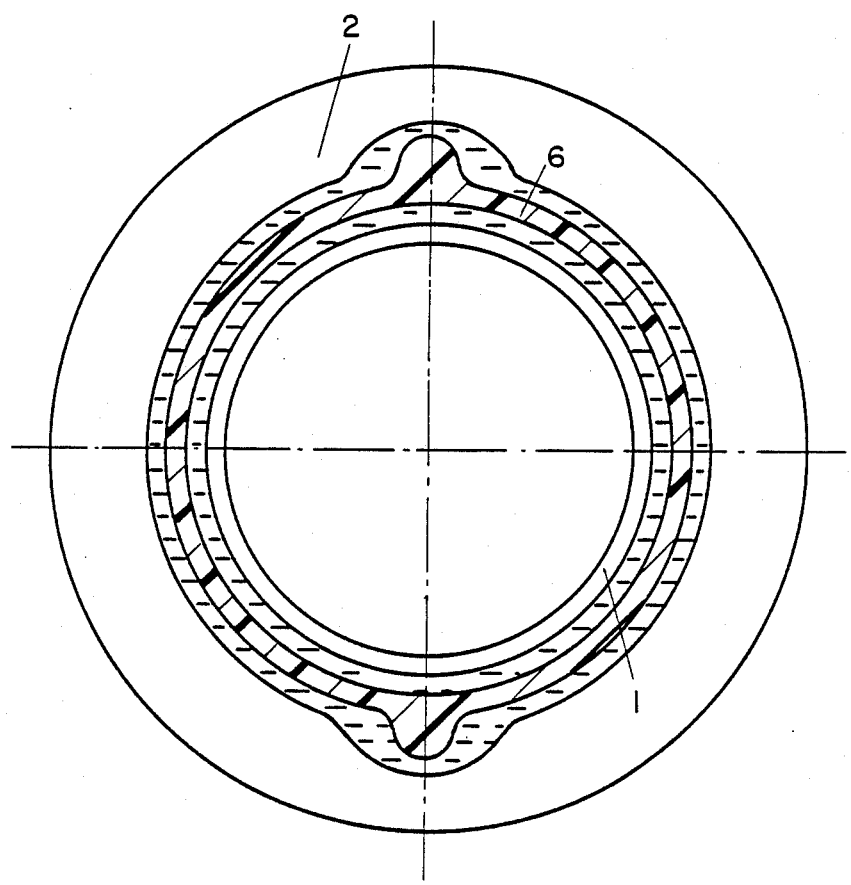
Figure 7:
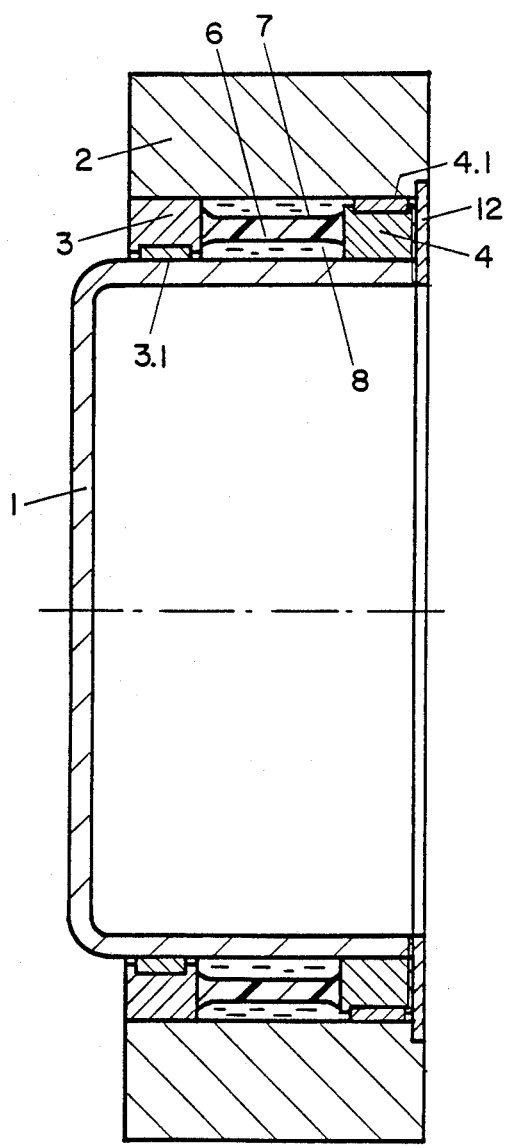

FIG. 3 shows a construction similar to that of FIG. 2, in which the resilient body is provided with two outwardly pointing projections, which lie opposite one another in the radial direction and which, in the unloaded state of the torsional vibration damper, lock radially into pockets of the rotating ring. Openings of the jacket forming the resilient body are positioned in the circumferential direction on either side ahead of the projections;

FIG. 4 shows a construction similar to that of FIG. 3, in which the jacket, which forms the resilient body, is not pierced anywhere on its periphery by an opening;

FIG. 5 shows a construction similar to that of FIG. 3, in which the pockets and the projections have a circularly bounded profile. Openings in the jacket forming the resilient body are positioned in the circumferential direction on either side ahead of the projections;

FIG. 6 shows a torsional vibration damper similar to that of FIG. 5, in which the jacket, which forms the resilient body, is not pierced anywhere on its periphery by an opening;

FIG. 7 shows a torsional vibration damper similar to that of FIG. 1, in which the liquid-filled gaps are closed off axially on both sides in the axial direction by rigid, liquid-tight sealing washers, which are connected with the rotating ring. The sealing washers can be rotated relative to the hub ring and overlap the profile of the gaps in the radial direction at least up to the plane of the innermost periphery.

Figure 8:
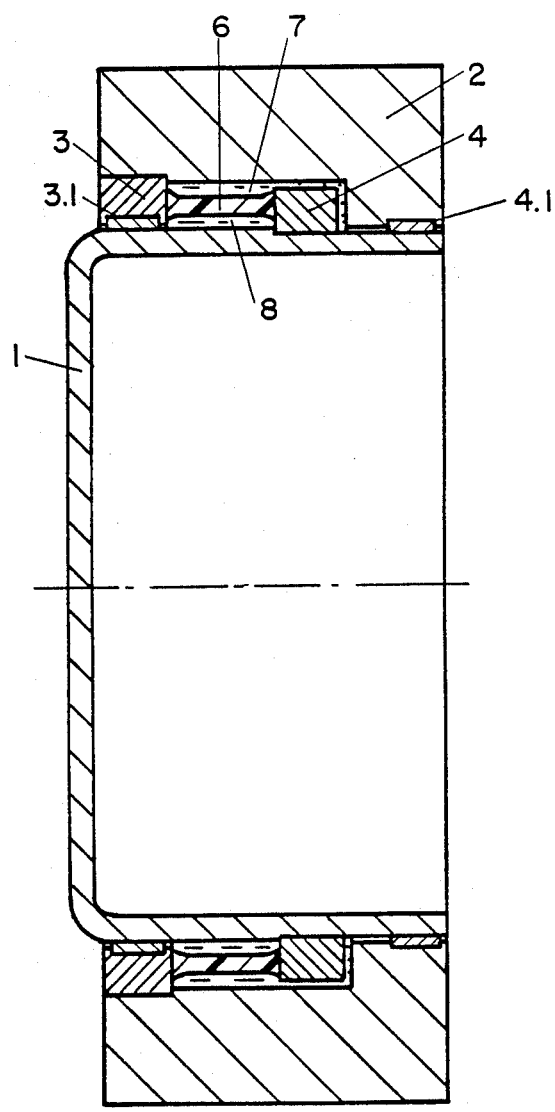

FIG. 8 is a torsional vibration damper similar in construction to that shown in FIG. 1, in which in the right half of the representation a collar is used to fix the resilient body to the hub ring. This collar is spatially separate from the guide for the outer ring. The construction is distinguished by an excellent and particularly simple static seal of the gap filled with liquid. With respect to its action, the construction is very similar to that of FIG. 7.

Figure 9:
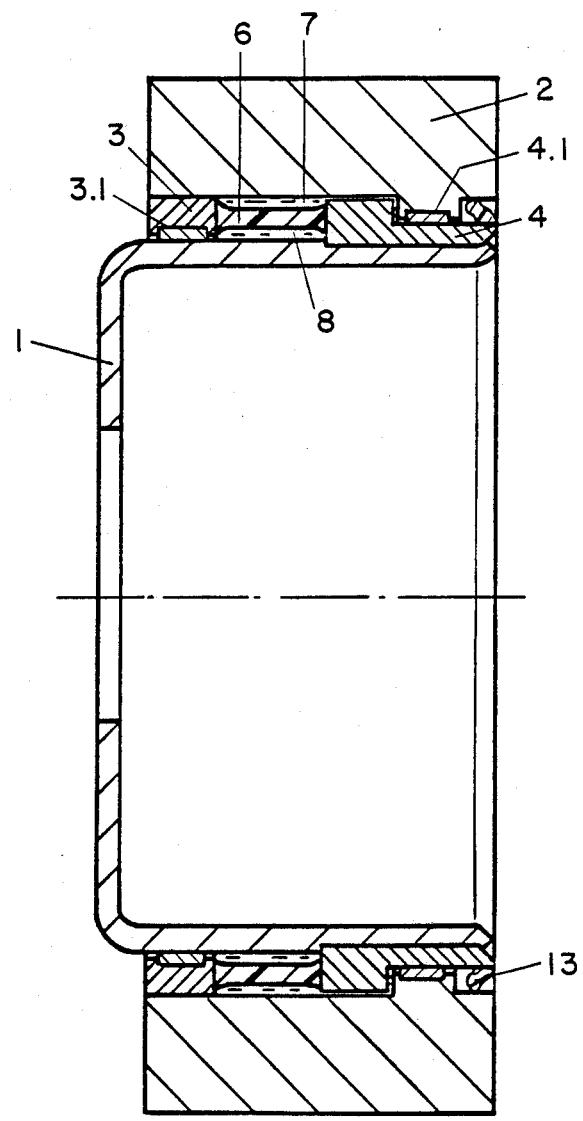

FIG. 9 shows a construction of the torsional vibration damper of the invention, which is very similar to that of FIG. 8 and in which the hub ring is sealed relative to the rotating ring by a lip seal.

Referring now more particularly to FIG. 1, the torsional vibration damper shown in FIG. 1 comprises the hub ring 1 and the rotating ring 2. Both preferably are supported by guides 3.1, 4.1, so that they can be rotated relative to one another. The two guides preferably are positioned on collars 3, 4, between which there is a distance in the axial direction. The collars 3, 4 preferably are connected in the axial direction by a tubular resilient body 6, which encloses the axis of rotation of the torsional vibration damper axially symmetrically and preferably comprises a rubber elastic material. In the outwards radial direction as well as in the inwards radial direction, the resilient body is separated by a radial distance from the surfaces of the opposite machine parts. Gaps 7, 8, which are filled with a flowable, incompressible medium, preferably with a liquid, are formed by the respective distances.

The following can be said about the function.

The torsional vibration damper shown preferably is fixed untwistably and concentrically with its hub ring 1 to the machine part that is to be damped. It therefore follows the rotational movements of this machine part in a completely synchronous manner.

The hub ring is pot-shaped. The collar 4 preferably is fixed untwistably on the part of the hub-ring profile, which extends in the axial direction. It is also fixed so as to be immovable in the axial direction. On its outer periphery, the collar 4 carries the guide ring 4.1, which lies relatively movably against the inner side of the rotating ring 2.

In the left part of the representation, the rotating ring 2 contains the collar 3, which preferably is fixed untwistably and axially immovably to it. On the inside, the collar 3 has the guide ring 3.1, which lies relatively movably against the surface of the part of the hub ring 1 extending in the axial direction. The guide rings 3.1 and 4.1 preferably are of a sintered metal, for example, sintered together of bronze particles, of steel particles, or of brass particles.

The two collars are connected by the resilient body 6. The latter is assigned axially symmetrically to the axis of rotation of the torsional vibration damper and is made from a rubber elastic material. It preferably is connected on the face by vulcanization on the one hand with the collar 3 and thus with the rotating ring 2 and, on the other, with the collar 4 and thus with the hub ring. Furthermore, the resilient body extends in the radial direction by an amount, which is less than the distance between the rotating ring 2 and the hub ring 1. The hereby formed gaps preferably are filled on both sides with a similar flowable medium liquid, namely with a silicone oil. The flowable medium preferably has a density which essentially is the same as the density of the material that forms the resilient body 6. The flowable medium may also, for example, consist of fat.

Operationally induced torsional vibrations, introduced into the hub ring 1, are transferred by this ring over the collar to the resilient body 6 and from this over collar 3 to the rotating ring 2. Due to the elasticity of the resilient body, the rotating ring does not follow in a synchronous manner the torsional vibrations effective in the region of the hub ring 1. It thereby exerts forces reacting over resilient body 6 on the hub ring 1. This is utilized for damping the torsional vibrations operative here.

The relative association of the resilient body with the rotating ring 2 and with the hub ring 1 does not experience any changes whatsoever as a result of the operationally induced centrifugal forces. The resulting damping behavior is therefore completely independent of the rotational speed and is determined only by the viscosity of the liquid used, the magnitude, construction and mutual association on the one hand of the surfaces of the resilient body lying opposite to one another in the area of the gap and, on the other, of the rotating ring or the hub ring, as well as by the size. The matching of the torsional vibration damper of the invention to the particular application circumstances is therefore particularly easy. It readily makes optimization possible with respect to constructions, which are distinguished by an especially low weight and by a particularly good effectiveness.

The operationally induced warming up leads to an increase in volume at least of the liquid quantity contained in the gaps and of the resilient body. For the construction shown, this is compensated for by a relative axial displacement of the rotating ring on the guide rings 3.1 and 4.1 in a direction to the left and does not result in any function-changing build-up in pressure.

The construction shown in FIG. 2 is similar to that described above. The jacket, forming the resilient body 6, is, however, pierced at two opposite places on its periphery by recesses 9, through which the liquid contained in the gaps can flow back and forth between the two gaps. By these means, the load on the resilient body is reduced from a static point of view, which is an advantage, for example, in relation to uses, in which heat may be expected to act asymmetrically on the gaps, for example, only from the inside or only from the outside.

The construction shown in FIG. 3 is similar to that described above. In addition to four mutually opposite openings 9 of the resilient body 6 of rubber, two mutually opposite projections 10 of the resilient body are provided here, which point towards the outside in the radial direction and which lock into appropriately formed pockets of the rotating wheel 2. With respect to their profiles, the pockets 11 and the projections 10 are so designed that, when the torsional vibration damper is not under load, there is a space between all regions. The introduction of a relative rotation, however, requires displacement of components of the liquid from the projections 10 into areas of the pockets 11, which are positioned ahead in the direction of rotation. This requires additional work and brings about a particularly good damping action. The openings 9 in the resilient body may be constructed so as to be very narrow. In such a case, they would form restrictor openings, which support the achievement of a good damping action.

The construction shown in FIG. 4 is similar to that described above. However, the resilient body 6 is not pierced by openings. In this case also, the gaps 7, 8 are filled with an identical liquid, for example, with a silicone oil. The operation of the torsional vibration damper may also be such that it becomes necessary to fill only the outer gap 7.

With respect to function and structure, the construction shown in FIG. 5 is similar to that shown in FIG. 3. In this case, however, the pockets and projections have a semicircular profile, which leads to a progressive damping action when starting to rotate hub ring 1 relative to the rotating ring 2.

In this case, the openings 9 in the resilient body also support the damping effect achieved.

The construction shown in FIG. 6 corresponds to that shown above. However, there are no openings in the resilient body 6. The damping effect achieved is accordingly somewhat less.

With respect to its structure and function, the construction shown in FIG. 7 is similar to that shown in FIG. 1. However, to achieve an improved seal of the gaps 7, 8 filled with liquid, the rotating ring 2 is provided with a liquid-tight and statically resting sealing washer 12, which slightly overlaps towards the inside the innermost periphery of the gaps 7, 8. Even when the shaft is rotating at the highest speed, no liquid can leave the gaps 7, 8 in the axial direction. When the shaft is at rest, the centrifugal forces exerted on the liquid contained in the gaps are negligibly small. A leakage of the torsional vibration damper need therefore not be feared when the shaft is at rest.

From a functional point of view, the construction of FIG. 8 is of similar effectiveness to that described above. In this case, the collar 4 was separated structurally from the associated guide ring 4.1. This makes it possible to bring the profile of the rotating ring 2 in the area in question close to the innermost boundary of the gaps 7, 8.

In addition, there is a relative enlargement of the gap 7 by areas of little depth. In conjunction with the use of liquids of high viscosity, especially in gap 7, a high damping effect is achieved by these means. This is particularly effective in the range of low-frequency oscillations.

The construction shown in FIG. 9 is similar to that described above. It has an additional lip seal 13, preferably of rubber, which is positioned statically resting and liquid-tight on the hub ring 1 and which contacts the rotating ring 2 with a sealing lip under the action of centrifugal forces. As the rotational speed of the sealed machine part is increased, the sealing lip is pressed increasingly against the corresponding inner surface of the rotating wheel 2. The result accordingly is an excellent seal, which permits the torsional vibration damper shown to be used in areas, in which contamination by liquids or other materials no longer is acceptable.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A torsional vibration damper comprising:
a hub ring and a rotating ring which encircles said hub ring in a radial space, said hub ring being positioned in said rotating ring, a guide on said hub ring so that said rings can rotate relative to one another, said hub ring and said rotating ring having collars between which there is a clearance in the axial direction and which are connected by an essentially tubular resilient body extending in the axial direction, said collars being individually attached to said rings in said space, said resilient body having a radial clearance from said hub ring and from said rotating ring and the clearance between said rotating ring and said resilient body forming at least a gap in the radial and axial directions which is closed off towards the outside, and a flowable, incompressible medium filling at least said gap.

2. The torsional vibration damper of claim 1, wherein said hub ring and said resilient body form a gap therebetween which is closed off in the radial and axial directions towards the outside, and a flowable incompressible medium filling said gap between said hub ring and said resilient body.

3. The torsional vibration damper of claim 2, wherein said resilient body has at least one recess which penetrates said resilient body in a radial direction, and wherein said flowable medium has a density which essentially is the same as the density of said resilient body.

4. The torsional vibration damper of claim 3, wherein said recess is narrowed into a restrictor opening.

5. The torsional vibration damper of claim 2, which includes a sealing washer for axially closing off said gaps in the axial direction, said sealing washer being rigid and liquid-tight and connected with said rotating ring, and said sealing washer being brought close to said hub ring, so as to form a seal with it, and being rotatable relative to said hub ring and overlapping the profile of the gaps in the radial direction at least up to the plane of the innermost periphery.

6. The torsional vibration damper of claim 2, which includes a lip seal for closing off said gap between said hub ring and said resilient body on at least one side of its axial extension.

7. The torsional vibration damper of claim 6, wherein said lip seal rests statically on said hub ring and touches said rotating ring due to centrifugal forces.

8. The torsional vibration damper of claim 1, wherein said flowable medium comprises oil.

9. The torsional vibration damper of claim 8, wherein said oil is a silicone oil.

10. The torsional vibration damper of claim 1, wherein said flowable medium consists of fat.

11. The torsional vibration damper of claim 1, wherein said resilient body has at least on the outside at least one radial projection which extends essentially axially, and wherein said gap expands in the area of said projection into a pocket which locks with said rotating ring and which encircles said projection in an untwisted state of said rotating ring in a clearance.

12. The torsional vibration damper of claim 11, wherein said pocket has an essentially constant radial depth in a circumferential direction.

13. The torsional vibration damper of claim 11, wherein said pocket has on the outside an essentially circular boundary profile and wherein a radius (R 1) of said profile is smaller than a radius (R 2) of a circular boundary of the gap outside of said pocket.

* * * * *